(12) United States Patent
Sakamoto

(10) Patent No.: US 7,658,985 B2
(45) Date of Patent: Feb. 9, 2010

(54) HONEYCOMB STRUCTURE

(75) Inventor: Hirofumi Sakamoto, Chita-gun (JP)

(73) Assignee: NGK Insulators, Ltd., Nagoya (JP)

( * ) Notice: Subject to any disclaimer, the term of this patent is extended or adjusted under 35 U.S.C. 154(b) by 167 days.

(21) Appl. No.: 11/898,596

(22) Filed: Sep. 13, 2007

(65) Prior Publication Data

US 2008/0014405 A1    Jan. 17, 2008

Related U.S. Application Data

(63) Continuation of application No. PCT/JP2006/310189, filed on May 23, 2006.

(30) Foreign Application Priority Data

May 23, 2005   (JP)  .............................. 2005-149096

(51) Int. Cl.
    *B32B 3/12*   (2006.01)
(52) U.S. Cl. ....................... 428/116; 428/117
(58) Field of Classification Search ............... 428/116, 428/117, 119, 73, 34.4; 502/527.15, 527.17, 502/439; 264/177.12, 177.14; 55/523, 524, 55/483, 484, 488, 489
    See application file for complete search history.

(56) References Cited

U.S. PATENT DOCUMENTS

| | | | |
|---|---|---|---|
| 5,188,779 A * | 2/1993 | Horikawa et al. | ........... 264/630 |
| 6,395,370 B1 | 5/2002 | Noda et al. | |
| 6,890,616 B2 | 5/2005 | Suwabe et al. | |
| 7,037,567 B2 | 5/2006 | Hashimoto et al. | |
| 7,244,284 B2 | 7/2007 | Miwa et al. | |
| 2005/0180898 A1 | 8/2005 | Yamada | |
| 2006/0213163 A1 | 9/2006 | Taoka et al. | |
| 2007/0059483 A1 | 3/2007 | Fujita et al. | |
| 2007/0190289 A1 * | 8/2007 | Fujita | .......................... 428/116 |

FOREIGN PATENT DOCUMENTS

| | | |
|---|---|---|
| JP | A 2001-206780 | 7/2001 |
| JP | A 2002-301325 | 10/2002 |
| JP | A 2003-010616 | 1/2003 |
| JP | A 2003-251198 | 9/2003 |
| JP | A 2003-254034 | 9/2003 |
| JP | A 2004-262669 | 9/2004 |
| WO | WO 03/078026 A1 | 9/2003 |
| WO | WO 03/084640 A1 | 10/2003 |

\* cited by examiner

*Primary Examiner*—Timothy M Speer
*Assistant Examiner*—Gordon R Baldwin
(74) *Attorney, Agent, or Firm*—Oliff & Berridge, PLC

(57) ABSTRACT

A honeycomb structure useful as exhaust gas trapping filter, particularly, as a diesel particulate filter (DPF) for trapping particulate matter, etc. in diesel engine exhaust gas and capable of effectively inhibiting defects such as cracks due to thermal stress, by reducing influence of thermal stress generated upon use or regeneration. The honeycomb structure includes: an integrally joined body constituted of plural honeycomb segments at joint faces with a bonding material layer, and an outer peripheral coat layer. Thickness of the bonding material layer satisfies the relation: $(T2)=(1.2 \text{ to } 10.0) \times (T1)$ between an average thickness (T1) at positions (X1) and (X2) located at the both ends in the central axis direction of segments and a maximum thickness (T2) between positions (Y1) and (Y2) apart from respective ends in 3 to 40% of the whole length of the honeycomb segment.

8 Claims, 14 Drawing Sheets

HONEYCOMB STRUCTURE

This is a Continuation of International Application No. PCT/JP2006/310189 filed May 23, 2006, which claims the benefit of Japanese Application No. 2005-149096 filed May 23, 2005. The disclosure of the prior applications is hereby incorporated by reference herein in its entirety.

FIELD OF THE INVENTION

The present invention relates to a honeycomb structure having a plurality of honeycomb segments integrally joined by means of a bonding material layer. More particularly, the present invention relates to a honeycomb structure useful as a trapping filter for exhaust gas, particularly, as a diesel particulate filter (DPF) for trapping particulate matter (hereinafter sometimes referred to as "PM") or the like in exhaust gas from a diesel engine and capable of effectively inhibiting a defect such as a crack due to thermal stress from being caused by lightening influence of thermal stress generated upon use or upon regeneration.

BACKGROUND OF THE INVENTION

A honeycomb structure is installed into a gas exhaust system of a diesel engine to be used as a trapping filter for exhaust gas, for example, as a diesel particulate filter (DPF) for trapping and removing particulate matter contained in exhaust gas from a diesel engine or the like. Such a honeycomb structure has an weakness of having a defect such as a crack due to thermal stress generated in accordance with a difference in thermal expansion depending on a portion because of uneven temperature rise depending on a portion derived from an uneven gas flow, or the like, upon use (upon trapping and removing particulate matter) and upon regeneration (upon combusting and removing particulate matter accumulated inside the filter in order to eliminate increase in pressure loss due to particulate matter accumulated inside the filter in the course of time).

By considering that, in particular, a honeycomb structure using silicon carbide (SiC) as a part of raw material has a large thermal expansion coefficient (a high thermal stress generation) in comparison with a cordierite honeycomb structure and low thermal shock resistance though it is excellent in heat resistance, there have been proposed a honeycomb structure having a plurality of honeycomb segments integrally joined at joint faces by means of a bonding material layer to form a honeycomb segment joined body in order to reduce influence of thermal stress, a honeycomb structure where at least one of honeycomb segments not constituting the outermost peripheral surface of the honeycomb structure has a higher average wall thickness and a lower or the same cell density than or as at least one of honeycomb segments constituting the outermost peripheral surface of the honeycomb structure (see Patent Document 1), a honeycomb structure containing a honeycomb segment having a higher heat capacity per unit volume in the outer peripheral side portion of the honeycomb segment than that in the central side portion of the honeycomb segment (see Patent Document 2), and a honeycomb filter having a higher heat capacity in the central portion in a cross-section perpendicular to an axial direction of the honeycomb filter than that in the peripheral portion in the cross-section (see Patent Document 3). However, it is difficult to solve a local temperature rise of a honeycomb structure according to local and drastic heat generation only by measures related to heat capacity, and the aforementioned inconvenience cannot always be inhibited sufficiently. In particular, as a filter has recently been enlarged, thermal stress generated upon use or upon regeneration has remarkably been increased in comparison with a conventional filter, and thereby frequency and extent of occurrence of a defect such as a crack has escalated to a serious state.

Patent Document 1: JP-A-2002-301325
Patent Document 2: JP-A-2003-10616
Patent Document 3: JP-A-2003-254034

DISCLOSURE OF THE INVENTION

The present invention has been made in view of the above problems and aims to provide a honeycomb structure useful as a trapping filter for exhaust gas, particularly, as a diesel particulate filter (DPF) for trapping particulate matter or the like in exhaust gas from a diesel engine and capable of effectively inhibiting a defect such as a crack due to thermal stress from being caused by lightening influence of thermal stress generated upon use or upon regeneration.

In order to achieve the above object, according to the present invention, the following honeycomb structures are provided.

[1] A honeycomb structure comprising:
a honeycomb segment joined body having a plurality of honeycomb segments integrally joined at joint faces by means of a bonding material layer, and
an outer peripheral coat layer covering an outer peripheral surface of the honeycomb segment joined body,
with a structure having plurality of cells functioning as fluid passages disposed in parallel with one another in a central axis direction;
wherein thickness of the bonding material layer satisfies the relation of $(T2)=(1.2 \text{ to } 10.0)\times(T1)$ between an average thickness ($T1$) at positions located at both the end portions in the central axis direction of the honeycomb segment and a maximum thickness ($T2$) between positions both 3 to 40% of the whole length of the honeycomb segment apart from both the end portions.

[2] A honeycomb structure according to the above [1], wherein the honeycomb segment has a square cross-sectional shape.

[3] A honeycomb structure according to the above [1] or [2], wherein the honeycomb segment joined body has a circular, an elliptic, or a race-track shape of a cross-section perpendicular to the central axis direction.

[4] A honeycomb structure according to any one of the above [1] to [3], wherein the honeycomb segment has a thermal expansion coefficient of $1\times10^{-6}/^\circ$ C. or more.

As described above, according to the present invention, there is provided a honeycomb structure useful as a trapping filter for exhaust gas, particularly, as a diesel particulate filter (DPF) for trapping particulate matter or the like in exhaust gas from a diesel engine and capable of effectively inhibiting a defect such as a crack due to thermal stress from being caused by lightening influence of thermal stress generated upon use or upon regeneration.

DESCRIPTION OF REFERENCE NUMERALS

Figure 1:
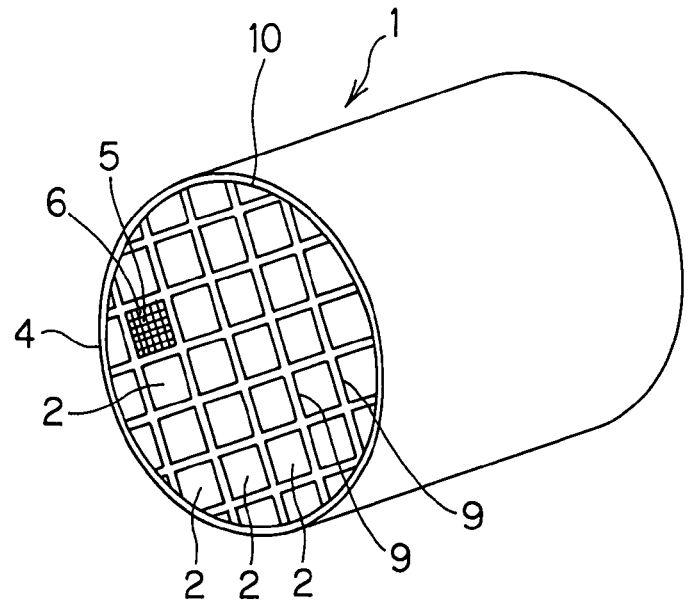
FIG. 1 is a perspective view schematically showing an embodiment (the whole cross-section taken along a plane perpendicular to the central axis is circular) of a honeycomb structure of the present invention.

1: honeycomb structure, 2: honeycomb segment, 2a: one of two adjacent honeycomb segments, 2b: the other of two adjacent honeycomb segments, 4: outer peripheral coat layer, 5: cell, 6: partition wall, 7: filler, 9: bonding material layer, 9a: bonding material layer in the vicinity of both ends, 9b: bonding material layer in the central portion, 9a$_1$: thin bonding material layer in the vicinity of an end, 9a$_2$: thin bonding material layer in the vicinity of the other end, 10: honeycomb segment joined body, 100: honeycomb segment, 102: roller or cutting drill, 104: depression (concave), 106: frame, 108: protrusion

BEST MODE FOR CARRYING OUT THE INVENTION

As shown in FIGS. 1 to 4, a honeycomb structure 1 of an embodiment of the present invention is a honeycomb structure 1 having a honeycomb segment joined body 10 having a plurality of honeycomb segments 2 integrally joined at joint faces by means of a bonding material layer 9 and an outer peripheral coat layer 4 covering an outer peripheral surface of the honeycomb segment joined body 10, with a structure having a plurality of cells 5 functioning as fluid passages disposed in parallel with one another in a central axis direction, and the honeycomb structure is characterized in that thickness of the bonding material layer 9 satisfies the relation of (T2)=(1.2 to 10.0)×(T1) between an average thickness (T1) at positions (X1) and (X2) located at the both end portions in the central axis direction of the honeycomb segment 2 and a maximum thickness (T2) between positions (Y1) and (Y2) both 3 to 40% of the whole length of the honeycomb segment 2 apart from the both end portions. Here, an average thickness (T1) means an average value of thickness measured at more than two different arbitrary locations among thickness of a bonding material layer 9 present in both end portions in a direction of the central axis of a honeycomb segment 2. The maximum thickness (T2) means the maximum thickness among thickness of a bonding material layer 9 present in the case of cutting a honeycomb segment 2 at the position corresponding to [(Y1) to (Y2)] of the bonding material layer 9 in an arbitrary plane perpendicular to a central axis direction of the honeycomb segment 2.

In the present invention, it is preferable that the relation of (T2)=(1.5 to 8.0)×(T1) is satisfied between the aforementioned (T1) and (T2), and it is more preferable that the relation of (T2)=(2.0 to 5.0)×(T1) is satisfied between the aforementioned (T1) and (T2). When (T2) is below 1.2 times (T1), an expected effect cannot be obtained. When (T2) is above 10.0 times (T1), a bend of passages is so large that flow resistance is remarkably increased.

Figure 9:
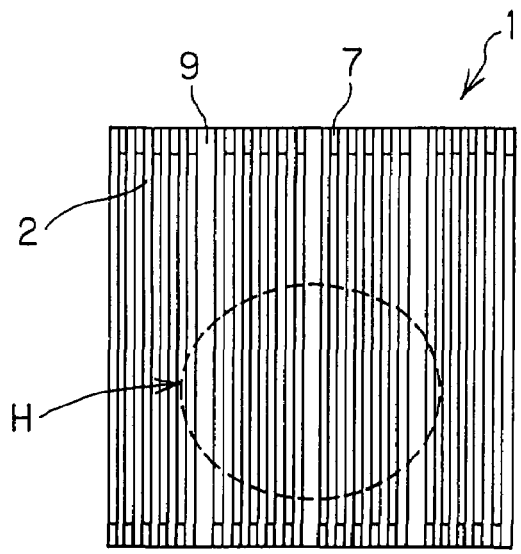
FIG. 9 is an explanatory view schematically showing a portion with high probability of having the highest temperature rise upon use or upon regeneration.

In the present invention, a bonding material layer is so constituted that it has the maximum thickness (T2) between the positions (Y1) and (Y2) apart from the respective ends of the plural segments in 3 to 40% (preferably 10 to 20%) of the whole lengths. This is because this portion H (see FIG. 9) has high probability of having the highest temperature rise upon use or upon regeneration for the reasons that an exhaust gas flow is prone to concentrate in the center, the outer peripheral portions is vulnerable to radiation, and the like. The present invention aims at effectively inhibiting a defect such as a crack due to thermal stress from being caused by lightening influence of thermal stress generated by the temperature rise. For this purpose, the bonding material layer is constituted so as to have a function of lightening influence of thermal stress.

Figure 3:
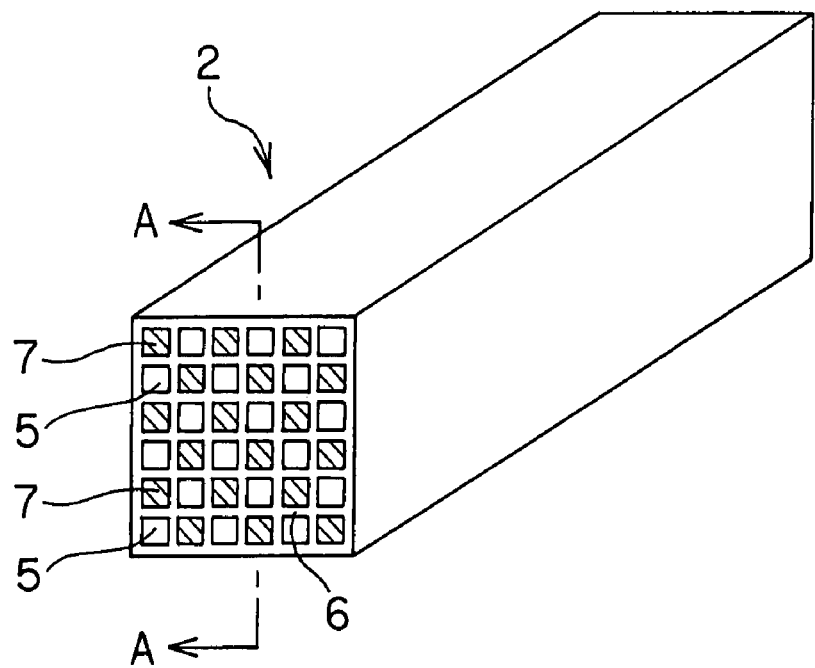
FIG. 3 is a perspective view schematically showing a honeycomb segment used in another embodiment of a honeycomb structure of the present invention.
Figure 4:
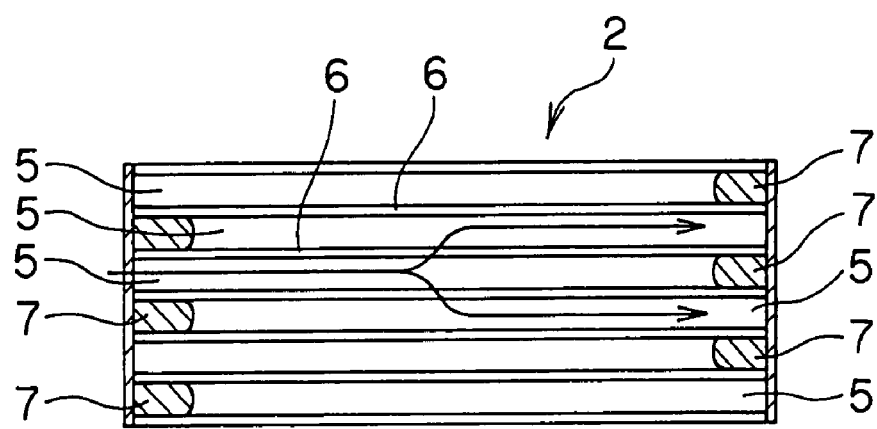
FIG. 4 is a cross-sectional view along the A-A line in FIG. 3.

A structure of the honeycomb structure 1 in an embodiment of the present invention will hereinafter be described more in detail. The honeycomb structure 1 in an embodiment of the present invention is constituted as a honeycomb structure provided with a honeycomb segment joined body 10 where a plurality of honeycomb segments 2 having a structure in which a plurality of cells 5 separated and constituted by porous partition walls 6 and functioning as fluid passages are disposed so as to be in parallel with one another in a direction of the central axis of the honeycomb structure 1 and each having a shape for forming a part of the whole structure and a shape for forming the whole structure by being combined in a direction perpendicular to the central axis of the honeycomb structure 1 are integrally joined with a bonding material layer 9 and an outer coat layer 4 for covering the outer peripheral surface of the honeycomb segment joined body 10. After the honeycomb segments 2 are joined with the bonding material layer 9, they are subjected to grinding so that a cross-section of the whole body taken along a plane perpendicular to the central axis of a honeycomb structure 1 may have a shape of a circle, an ellipse, a race-track, or a deformed shape thereof, and subsequently are covered with the outer peripheral surface with the outer peripheral coat layer 4. In the case that the honeycomb structure 1 is used as a DPF, PM containing soot discharged from a diesel engine can be trapped by arranging the honeycomb structure in a gas exhaust system, or the like. Incidentally, in FIG. 1, cells 5 and partition walls 6 are shown only in one honeycomb segment 2. As shown in FIGS. 3 and 4, each honeycomb segment 2 has a shape for forming a part of the whole structure of a honeycomb structure 1 (honeycomb segment joined body 10) (see FIG. 1) and has a shape for forming the whole structure by being combined in a direction perpendicular to the central axis of the honeycomb structure 1 (see FIG. 1). The cells 5 are disposed so as to be in parallel with one another in a direction of the central axis of the honeycomb structure 1, and each of the end portions in adjacent cells 5 are alternately plugged with a filler 7.

Figure 2:
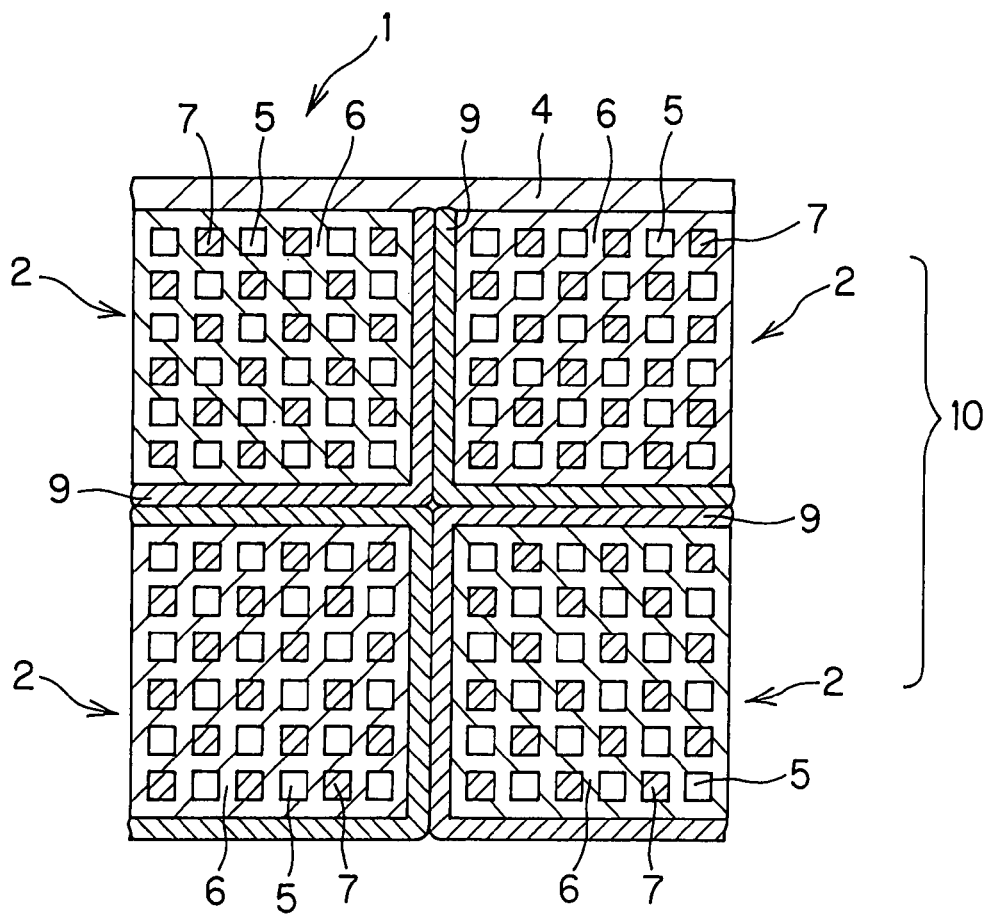
FIG. 2 is a front view of a part of another embodiment (the whole cross-section taken along a plane perpendicular to the central axis is square) of a honeycomb structure of the present invention, viewed from an end face side.

In predetermined cells 5 (inflow cells), end portions are left open on the left sides in FIG. 3 and FIG. 4 and plugged with a filler 7 on the other side. In the other cells 5 adjacent to the above cells (outflow cells), end portions are plugged with a filler 7 on the near side in FIG. 3 and the left side in FIG. 4 and left open on the other side. Such plugging gives the end faces of the honeycomb segment 2 a checkerwise pattern as shown in FIG. 2. In the case that a honeycomb structure 1 where a plurality of such honeycomb segments 2 are joined is arranged in a gas exhaust system, exhaust gas flows into cells 5 of each honeycomb segment 2 from the left side in FIG. 4 and moves toward the right side.

FIG. 4 shows a case that an inlet of exhaust gas is on the left side of the honeycomb segment 2. Exhaust gas flows into the honeycomb segment 2 from cells 5 (inflow cells) opening without being plugged, passes through the porous partition walls 6, and flows out from the other cells 5 (outflow cells). When the exhaust gas passes through the porous partition walls 6, PM containing soot in exhaust gas get trapped by the partition walls 6. Thus, exhaust gas can be purified. Since PM containing soot accumulates inside the honeycomb segment 2 by such trapping with the lapse of time and raises pressure loss, regeneration is performed to combust soot or the like. Incidentally, though FIGS. 2 to 4 show honeycomb segments 2 having a square cross-section of the whole body, the cross-section may be a square, a partially deformed square, a triangle, a hexagon, and the like. In addition, a cross-section of the cells 5 may have a shape of a polygon, a circle, an ellipse, a race-track, or a deformed shape thereof.

As a material for the honeycomb segment 2, it is preferable to use at least one kind selected from a group consisting of silicon carbide, silicon-silicon carbide based composite material, silicon nitride, cordierite, mullite, alumina, spinel, silicon carbide-cordierite based composite material, silicon-silicon carbide composite material, lithium aluminum silicate, aluminum titanate, and Fe—Cr—Al based metal from the viewpoint of strength and heat resistance. Of these, silicon carbide or silicon-silicon carbide based composite material is preferable.

The honeycomb segment 2 can be manufactured by, for example, adding a binder such as methyl cellulose, hydroxypropoxyl cellulose, hydroxyethyl cellulose, carboxymethyl cellulose, and polyvinyl alcohol; a surfactant, water as a solvent, and the like, to a material selected from the above to prepare clay having plasticity and subjecting this clay to extrusion forming to have the aforementioned shape and then drying with microwaves, hot air, and the like, followed by sintering. In the present invention, the honeycomb segment 2 preferably has a thermal expansion coefficient of $1\times10^{-6}/°$ C. or more, more preferably $2\times10^{-6}/°$ C. or more. When it is below $1\times10^{-6}/°$ C., the necessity of requiring stress relaxation function in the bonding material layer may remarkably be decreased.

As a material for the filler 7 used for plugging the cells 5, a material similar to that for the honeycomb segment 2 can be used. The plugging with the filler 7 can be performed by filling a slurried filler 7 into the open cells 5 by immersing an end of the honeycomb segment 2 in the slurried filler 7 in the state that the cells 5 not to be plugged are masked. Though filling of the filler 7 after forming may be performed before or after firing of the honeycomb segment 2, filling before firing is preferable because in that case only one firing step is required.

After the honeycomb segment 2 is manufactured as described above, a slurried bonding material layer 9 is applied on the outer peripheral surface of the honeycomb segment 2, and a plurality of honeycomb segments 2 is combined so as to form a predetermined solid shape (whole structure of the honeycomb structure 1) to be subjected to press-fitting in this combined state, followed by heat-drying. Thus, a joined body where a plurality of honeycomb segments 2 is integrally joined is manufactured. Then, the joined body is subjected to grinding to have the aforementioned shape, and the outer peripheral surface is coated with the outer peripheral coat layer 4, followed by heat-drying. Thus, the honeycomb structure 1 shown in FIG. 1 is manufactured.

The bonding material layer 9 used in the present invention is applied on the outer peripheral surfaces of the honeycomb segments 2 and has functions of joining the honeycomb segments 2 and lightening thermal stress. The bonding material layer 9 may by applied on the outer peripheral surface of each of adjacent honeycomb segments 2 or only on one of the corresponding outer peripheral surfaces.

Such application on only one of the corresponding surfaces is preferable in that an amount of the bonding material layer 9 used can be saved. Thickness of the bonding material layer 9 is determined in consideration of bonding force between the honeycomb segments 2 and suitably selected, for example, within the range of 0.2 to 4.0 mm.

A bonding material layer 9 used in the present invention preferably contains ceramics as the main component as well as a granular filler. The same material can be used for the bonding material layer 9 and the outer peripheral coat layer 4. In the present embodiment, examples of ceramics contained as the main component in the bonding material layer 9 and the outer peripheral coat layer 4 include ceramics such as silicon carbide, silicon nitride, cordierite, alumina, and mullite. Furthermore, there may be added a colloidal sol such as colloidal silica and colloidal alumina, as necessary, a metal fiber and a pore former.

The outer peripheral coat layer 4 is applied on the outer peripheral surface of a joined body of the honeycomb segments 2 to function as a protector for the outer peripheral portion of the joined body of the honeycomb segments 2. Thickness of the outer peripheral coat layer 4 is suitably selected within the range from 0.1 to 1.5 mm, for example.

The granular filler contained in the bonding material layer 9 and the outer peripheral coat layer 4 may be composed of an inorganic material or an organic material. Examples of the inorganic material include glass beads and fly ash balloon. Examples of the organic material include starch and foaming resin.

The granular filler preferably has an average diameter of 10 to 300 μm, more preferably 15 to 250 μm, and particularly preferably 20 to 200 μm. The granular filler preferably has a ratio of a longer central axis to a shorter central axis of 1.0 to 4.0 and more preferably is to be a true sphere. The granular filler is preferably contained in the bonding material layer 9 and the outer peripheral coat layer 4 at a rate of 20 to 70 vol %, more preferably 25 to 65 vol %, and particularly preferably 30 to 60 vol %. In addition, the granular filler preferably has a hollow structure. By using a particle having a hollow structure (hollow particle), the joint portion and the outer peripheral surface formed by the hardening of the bonding material layer 9 and the outer peripheral coat layer 4, respectively, have a lowered density, and thereby Young's modulus can be lowered. This improves thermal shock resistance of the joint portion and the outer peripheral surface, and a crack can be inhibited from being generated upon use.

The bonding material layer 9 and the outer peripheral coat layer 4 may contain at least one kind selected from a group consisting an inorganic particle, an oxide fiber, and a colloidal oxide at a rate of 5 to 60 mass % in addition to the above ceramic and granular filler. By mixing these, the bonding material layer 9 and the outer peripheral coat layer 4 can have improved characteristics. Examples of the inorganic particle include at least one kind of ceramic selected from a group consisting of silicon carbide, silicon nitride, cordierite, alumina, mullite, zirconia, zirconium phosphate, aluminum titanate, and titania; Fe—Cr—Al based metal; nickel based metal; metal Si; and SiC. Examples of the oxide fiber include aluminosilicate fiber and other fibers. Examples of the colloidal oxide include silica sol and alumina sol.

The bonding material layer 9 and the outer peripheral coat layer 4 preferably have a thermal conductivity of 0.1 to 5.0 W/m·k and preferably have a relatively low thermal expansion coefficient in order to inhibit a crack from being caused due to a thermal shock or the like, which is preferably within the range from $1 \times 10^{-6}$ to $8 \times 10^{-6}$/° C.

Figure 21A:
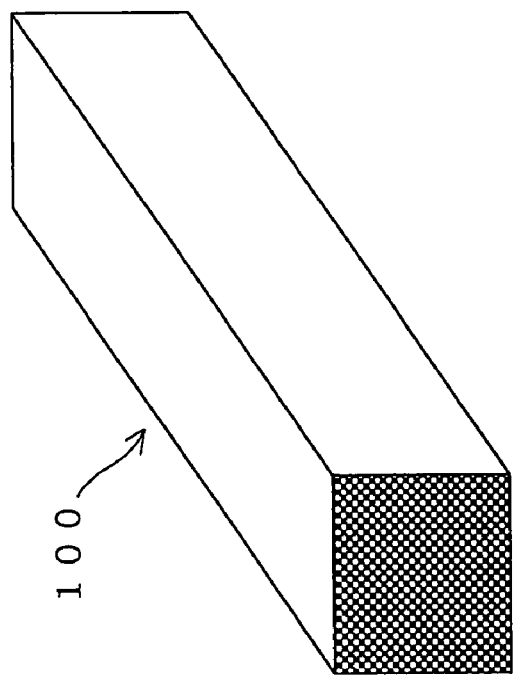
FIGS. 21(a) and 21(b) are explanatory views for explaining an embodiment of a method for forming a depression having a predetermined width in a side portion of a honeycomb segment.
Figure 21B:
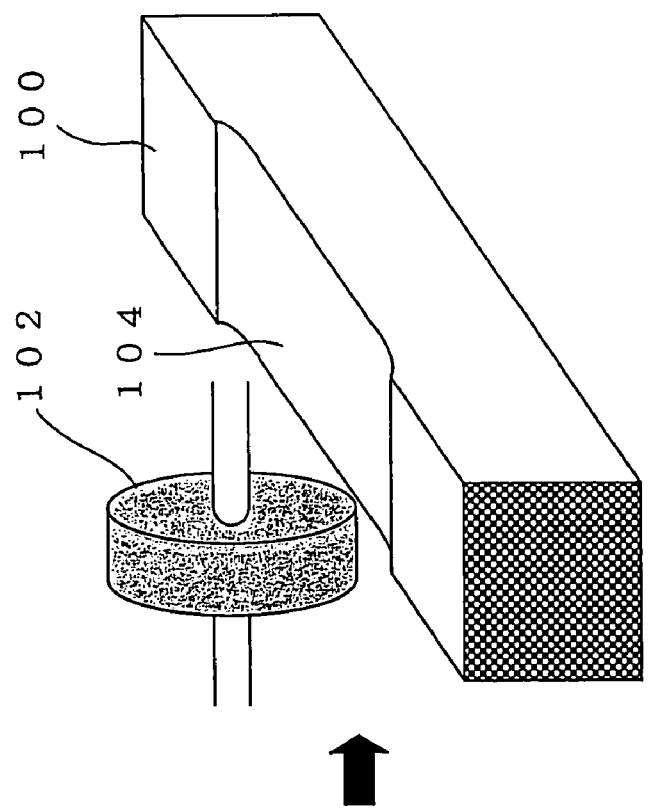

Next, a method for forming a depression having a predetermined width in the side portion of a honeycomb segment is described. In the embodiment shown in FIGS. 21(*a*) and 21(*b*), a depression 104 is formed in the honeycomb segment 100 before or after firing using a roller or a cutting drill 102.

Figure 22:
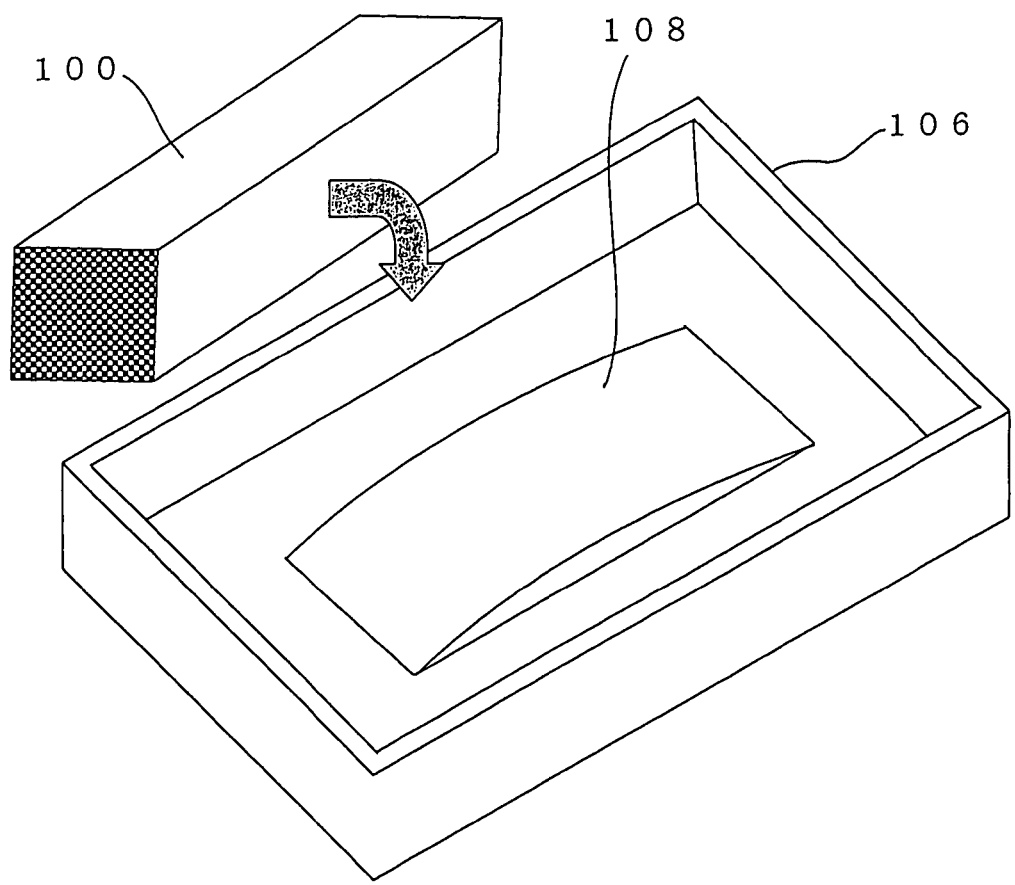
FIG. 22 is an explanatory view for explaining another embodiment of a method for forming a depression having a predetermined width in a side portion of a honeycomb segment.

In addition, in the embodiment shown in FIG. 22, a frame 106 for forming the depression upon firing is prepared. The frame 106 is provided with a protrusion 108 for forming a desired depression 104 in the side face portion of the honeycomb segment 100 upon firing. By firing the unfired honeycomb segment 100 mounted on the protrusion 108 of the frame 106, the honeycomb segment can have a shape of a predetermined depression after being fired.

As described above, there can be manufactured a honeycomb segment having a predetermined depression on the side face portion (on each of the four side faces in the case that a cross-section is square).

Figure 10:
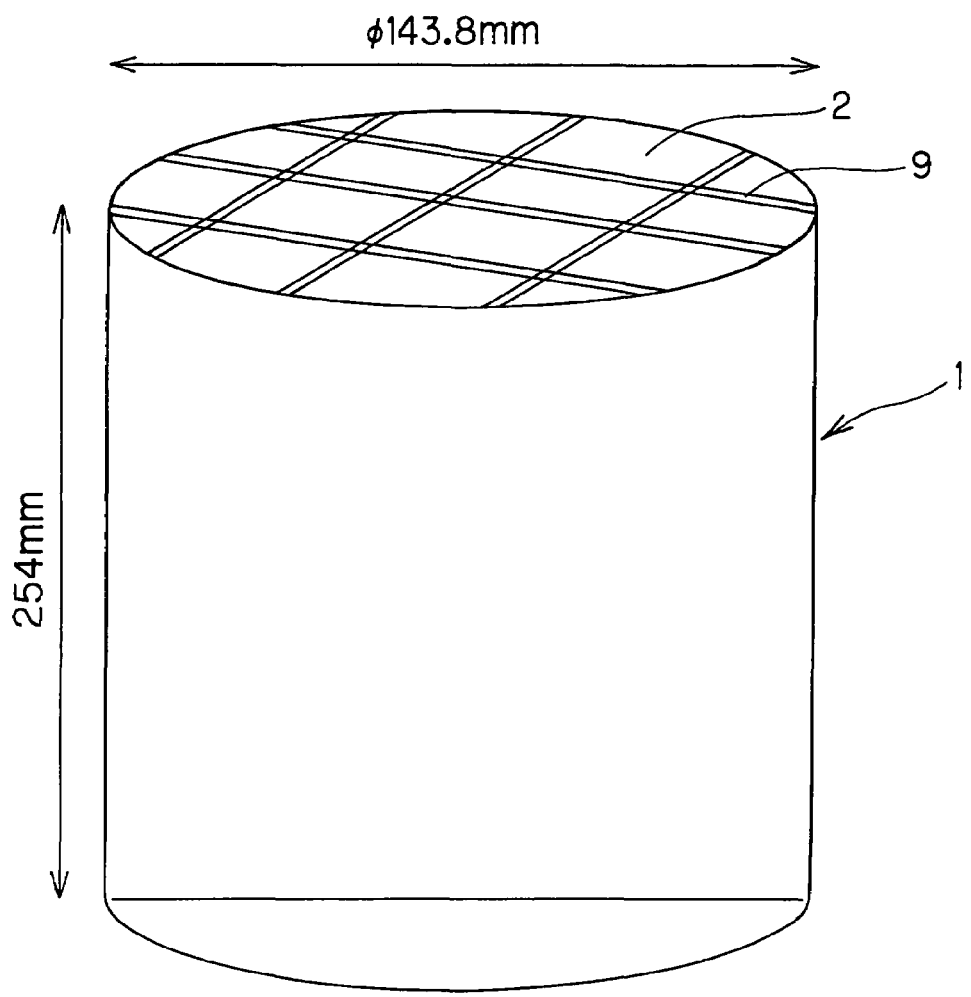
FIG. 10 is an explanatory view schematically showing the whole shape of a honeycomb structure in an Example.
Figure 11:
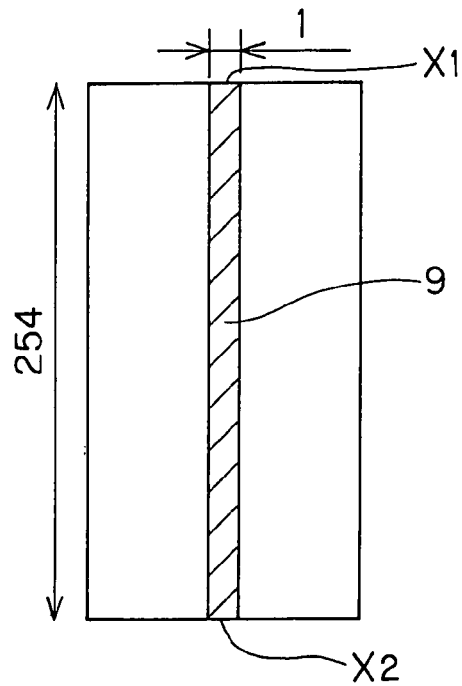
FIG. 11 is an explanatory view schematically showing thickness of a bonding material layer in Comparative Example 1.
Figure 12:
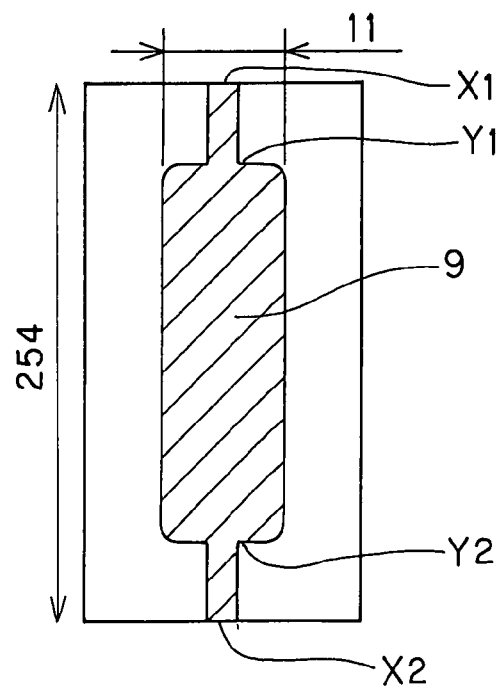
FIG. 12 is an explanatory view schematically showing thickness of a bonding material layer in Comparative Example 2.

A bonding material is applied on each of the side face portions of the honeycomb segments obtained as described above to manufacture a honeycomb segment joined body. Then, the honeycomb segment joined body is subjected to cutting, and an outer peripheral coating material is applied thereon to manufacture a honeycomb structure as shown in FIG. 10.

Figure 23:
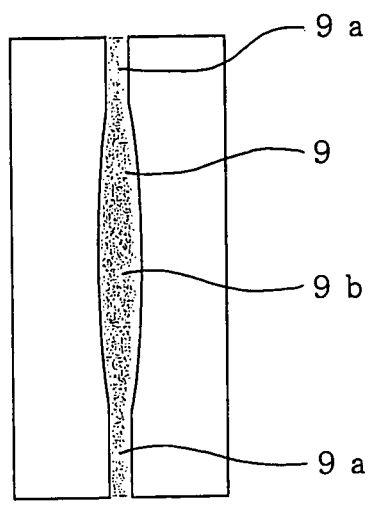
FIG. 23 is an explanatory view schematically showing another shape of a bonding material layer in a honeycomb structure of a present invention.
Figure 24:
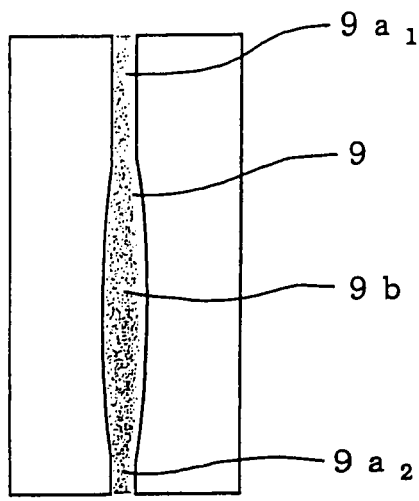
FIG. 24 is an explanatory view schematically showing still another shape of a bonding material layer in a honeycomb structure of the present invention.
Figure 25:
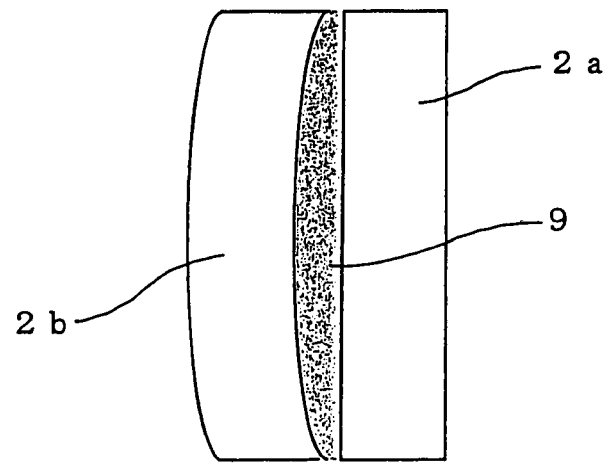
FIG. 25 is an explanatory view schematically showing yet another shape of a bonding material layer in a honeycomb structure of the present invention.
Figure 26:
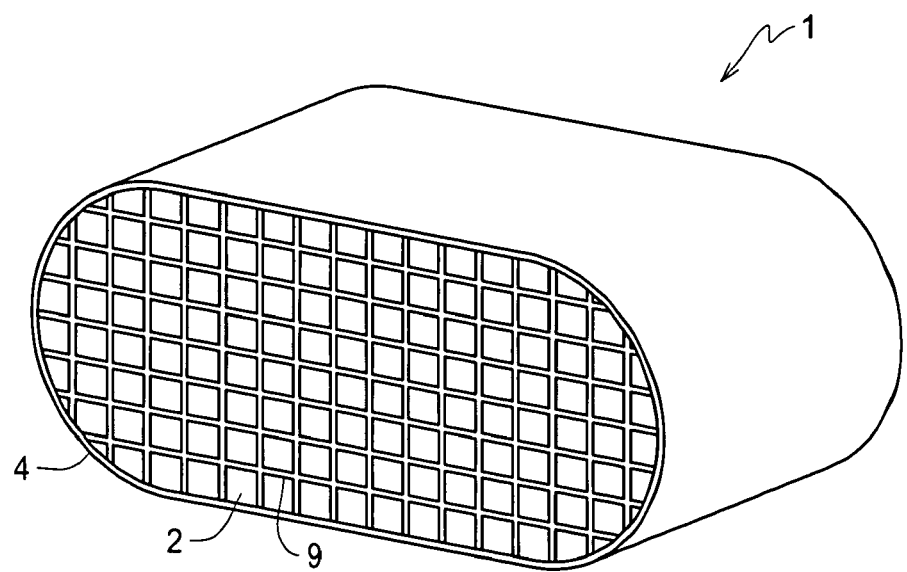
FIG. 26 is a perspective view schematically showing an embodiment (the whole cross-section taken along a plane perpendicular to the central axis is in a shape of a race-track) of a honeycomb structure.

In this honeycomb structure, besides a bonding material layer for bonding the honeycomb segments may have a shape having a thin bonding material layer 9a in the vicinity of each of the both end portions and a uniform thick bonding material layer 9b in the central portion as shown in FIGS. 5 to 8 and 14 to 17, there may be employed a shape having a thin bonding material layer 9a in the vicinity of each of the both end portions and a convex lens-like bonding material layer 9b, which becomes thicker toward the center, in the central portion as shown in FIG. 23, or a shape having a long thin bonding material layer $9a_1$ in the vicinity of an end portion, a short thin bonding material layer $9a_2$ in the vicinity of the other end portion, and a convex lens-like bonding material layer 9b in the central portion as shown in FIG. 24. Further, a honeycomb structure can be manufactured with a honeycomb segment 2a having no depression and the other honeycomb segment 2b having a warped shape as a whole to join in such a manner that the side having a protrusion of the honeycomb segment 2b faces the bonding material layer 9 as shown in FIG. 25.

EXAMPLES

The present invention will hereinbelow be described more specifically referring to Examples. However, the present invention is by no means limited by these Examples.

Example 1

Figure 5:
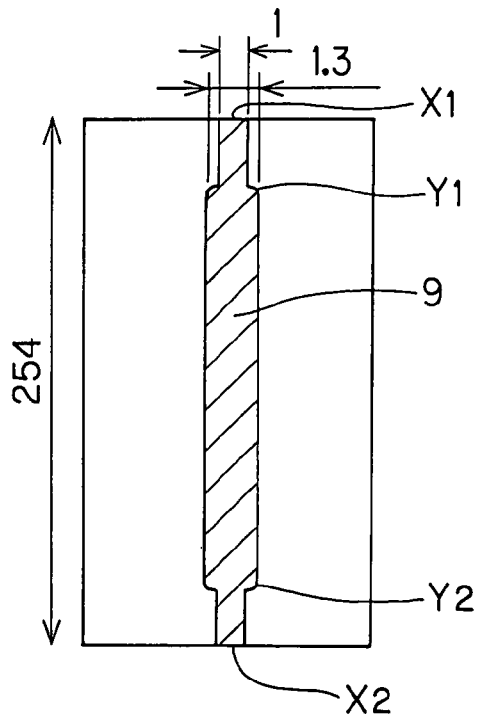
FIG. 5 is an explanatory view schematically showing thickness of a bonding material layer in Example 1.
Figure 6:
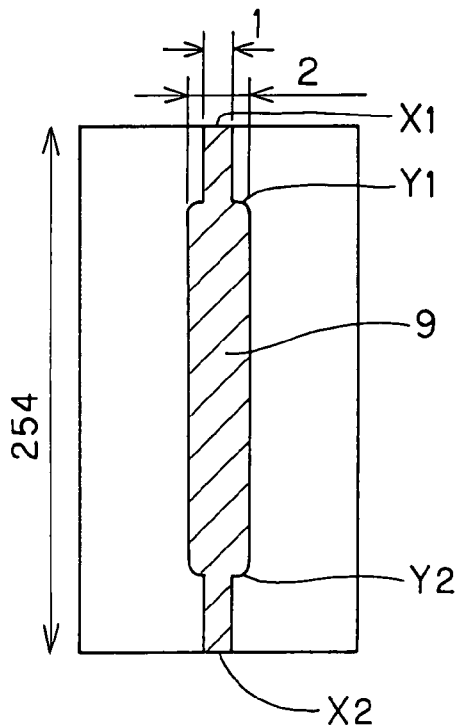
FIG. 6 is an explanatory view schematically showing thickness of a bonding material layer in Example 2.
Figure 7:
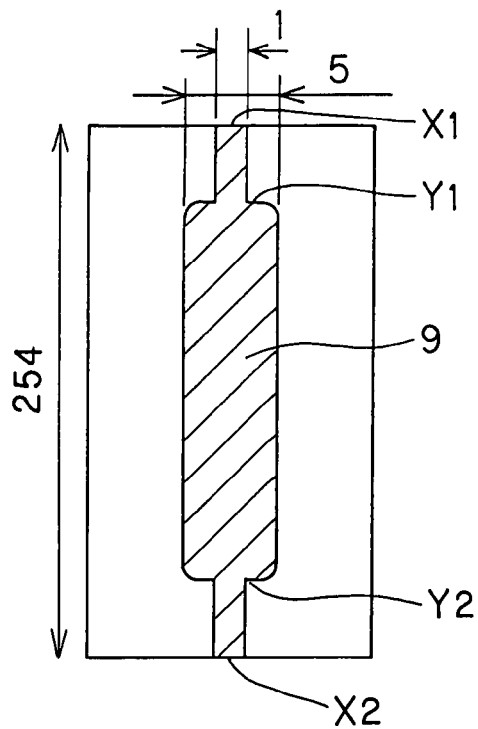
FIG. 7 is an explanatory view schematically showing thickness of a bonding material layer in Example 3.
Figure 8:
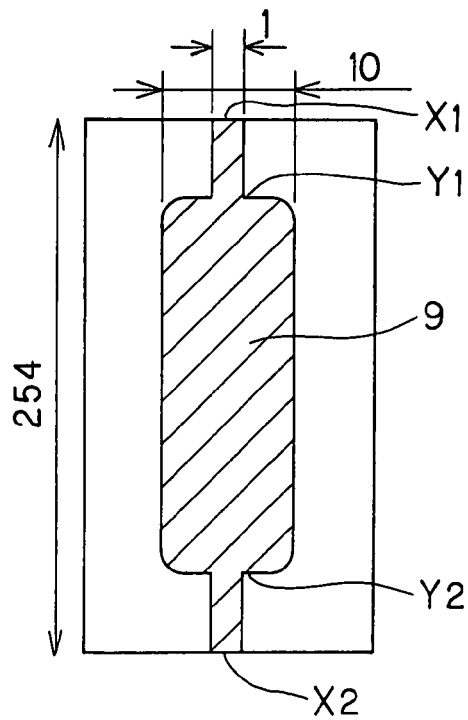
FIG. 8 is an explanatory view schematically showing thickness of a bonding material layer in Example 4.

A silicon carbide (SiC) powder as a silicon carbide raw material and a powder of potsherd (cordierite as a crystal phase) prepared by smashing a cordierite fired body into pieces as a cordierite raw material or talc which is a green raw material, kaolin clay, and alumina were mixed. With respect to 100 parts by mass of the mixed powder were added 6 parts by mass of methyl cellulose as an organic binder, 2.5 parts by mass of a surfactant, and 24 parts by mass of water, and they were uniformly mixed and kneaded to obtain clay for forming. This clay was subjected to extrusion forming to manufacture honeycomb segments each with dimensions of 35 mm×35 mm×254 mmL, a partition wall thickness of about 300 μm (12 mil), and a cell density of about 47 cell/cm² (300 cells/inch²). On each of the honeycomb segments was formed a predetermined depression in the side face portion thereof with a roller in the manner shown in FIGS. 21(a) and 21(b). These honeycomb segments were subjected to calcination for degreasing the binder at 550° C. for 3 hours in an oxidizing atmosphere and then firing at 1400° C. for 2 hours in non-oxidizing atmosphere. Then, a slurried bonding material was applied to join the honeycomb segment and hardened by drying to manufacture a honeycomb segment joined body. The honeycomb segment joined body was subjected to cutting, and then a slurried outer peripheral coat material was applied to form the outer peripheral coat layer. Thus, a porous silicon carbide sintered body (honeycomb structure) having a honeycomb structure with a diameter of 143.8 mm and a length of 254 mm as shown in FIG. 10 was obtained. In this case, as shown in FIG. 5, an average thickness (T1) of a bonding material layer was 1 mm, and the maximum thickness (T2) between the positions 9.8 percent of the whole length apart from the both end portions of the honeycomb segment was 1.3 mm (1.3 times the average thickness (T1)).

Examples 2 to 4, Comparative Examples 1 to 2

As shown in FIGS. 6 to 8, 10, and 11, the same manner as in Example 1 was taken except that the maximum thickness (T2) of the bonding material layer was changed to twice, 5 times, 10 times, 1.0 times, and 11 times the average thickness (T1). The average thickness (T1), the maximum thickness (T2), and a value of (T2)/(T1) are shown together in Table 1.

(Evaluation of [(T2)/(T1)])

PM was accumulated on a honeycomb structure by an engine, and then temperature of exhaust gas was raised up to about 650° C. to quickly combust PM, thereby the honeycomb structure was subject to thermal shock. After PM is removed, air at 25° C. was sent at a flow rate of 10 m³/min. to measure an allowable PM accumulation amount with no crack and a pressure loss (kPa) in the case that [(T2)/(T1)] (ratio) regarding thickness of the bonding material layer shows each of the values of Examples 1 to 4 and Comparative Examples 1 and 2. As a result, in the case of Example 1 (1.3 times), the allowable PM accumulation amount with no crack was 8 (g/L), and the pressure loss was 4 (kPa). In the case of Example 2 (2 times), the allowable PM accumulation amount with no crack was 10 (g/L), and the pressure loss was 4 (kPa). In the case of Example 3 (5 times), the allowable PM accumulation amount with no crack was 11 (g/L), and the pressure loss was 4.5 (kPa). In the case of Example 4 (10 times), the allowable PM accumulation amount with no crack was 12 (g/L), and the pressure loss was 7 (kPa). In the case of Comparative Example 1 (1.0 times), the allowable PM accumulation amount with no crack was 6 (g/L), and the pressure loss was 4 (kPa). In the case of Comparative Example 2 (11 times), the allowable PM accumulation amount with no crack was 12.2 (g/L), and the pressure loss was 9 (kPa). They are shown together in Table 1 and FIG. 13.

Examples 5 to 8, Comparative Examples 3 to 4

The same manner as in Example 2 was taken except that the point (distance from an end portion of the honeycomb segment) of measuring the maximum thickness (T2) was changed to the points between the positions 3.9% (10 mm), 9.8% (25 mm), 19% (50 mm), 39% (100 mm), 2.0% (5 mm), 43% (110 mm) of the whole length apart from the both end potions of the honeycomb segment as shown in FIGS. 14 to 17 and 18 and 19. The points of measuring the maximum thickness (T2) are shown together in Table 1.

(Evaluation of Points of Measuring Maximum Thickness (T2))

PM was accumulated on a honeycomb structure by an engine, and then temperature of exhaust gas was raised up to about 650° C. to quickly combust PM, thereby the honeycomb structure was subject to thermal shock to measure an allowable PM accumulation amount with no crack in the case that percentage of "the length from an end portion to (T2) portion (an enlarged portion including the maximum thickness (T2))" and the distance from an end portion to (T2) show each of the values of Examples 5 to 8 and Comparative Examples 3 and 4. As a result, in the case of Example 5 (3.9% (10 mm)), the allowable PM accumulation amount with no crack was 9 (g/L). In the case of Example 6 (9.8% (25 mm)), the allowable PM accumulation amount with no crack was 10 (g/L). In the case of Example 7 (19% (50 mm)), the allowable PM accumulation amount with no crack was 9.5 (g/L). In the case of Example 8 (39% (100 mm)), the allowable PM accumulation amount with no crack was 7 (g/L). In the case of Comparative Example 3 (2.0% (5 mm)), the allowable PM accumulation amount with no crack was 7 (g/L). In the case of Comparative Example 4 (43% (110 mm)), the allowable PM accumulation amount with no crack was 6.2 (g/L). They are shown together in Table 1 and FIG. 20.

TABLE 1

|  | T1 (mm) | T2 (mm) | T2/T1 | T2 measuring distance (%) (mm) | Allowable PM accumulation amount (g/L) | Pressure loss (kPa) |
| --- | --- | --- | --- | --- | --- | --- |
| Ex. 1 | 1 | 1.3 | 1.3 | 9.8 (25) | 8 | 4 |
| Ex. 2 | 1 | 2 | 2 | 9.8 (25) | 10 | 4 |
| Ex. 3 | 1 | 5 | 5 | 9.8 (25) | 11 | 4.5 |
| Ex. 4 | 1 | 10 | 10 | 9.8 (25) | 12 | 7 |
| Ex. 5 | 1 | 2 | 2 | 3.9 (10) | 9 | — |
| Ex. 6 | 1 | 2 | 2 | 9.8 (25) | 10 | — |
| Ex. 7 | 1 | 2 | 2 | 19 (50) | 9.5 | — |
| Ex. 8 | 1 | 2 | 2 | 39 (100) | 7 | — |
| Comp. Ex. 1 | 1 | 1 | 1 | — | 6 | 4 |
| Comp. Ex. 2 | 1 | 11 | 11 | 9.8 (25) | 12.2 | 9 |
| Comp. Ex. 3 | 1 | 2 | 2 | 2.0 (5) | 7 | — |
| Comp. Ex. 4 | 1 | 2 | 2 | 43 (110) | 6.2 | — |

Figure 13:
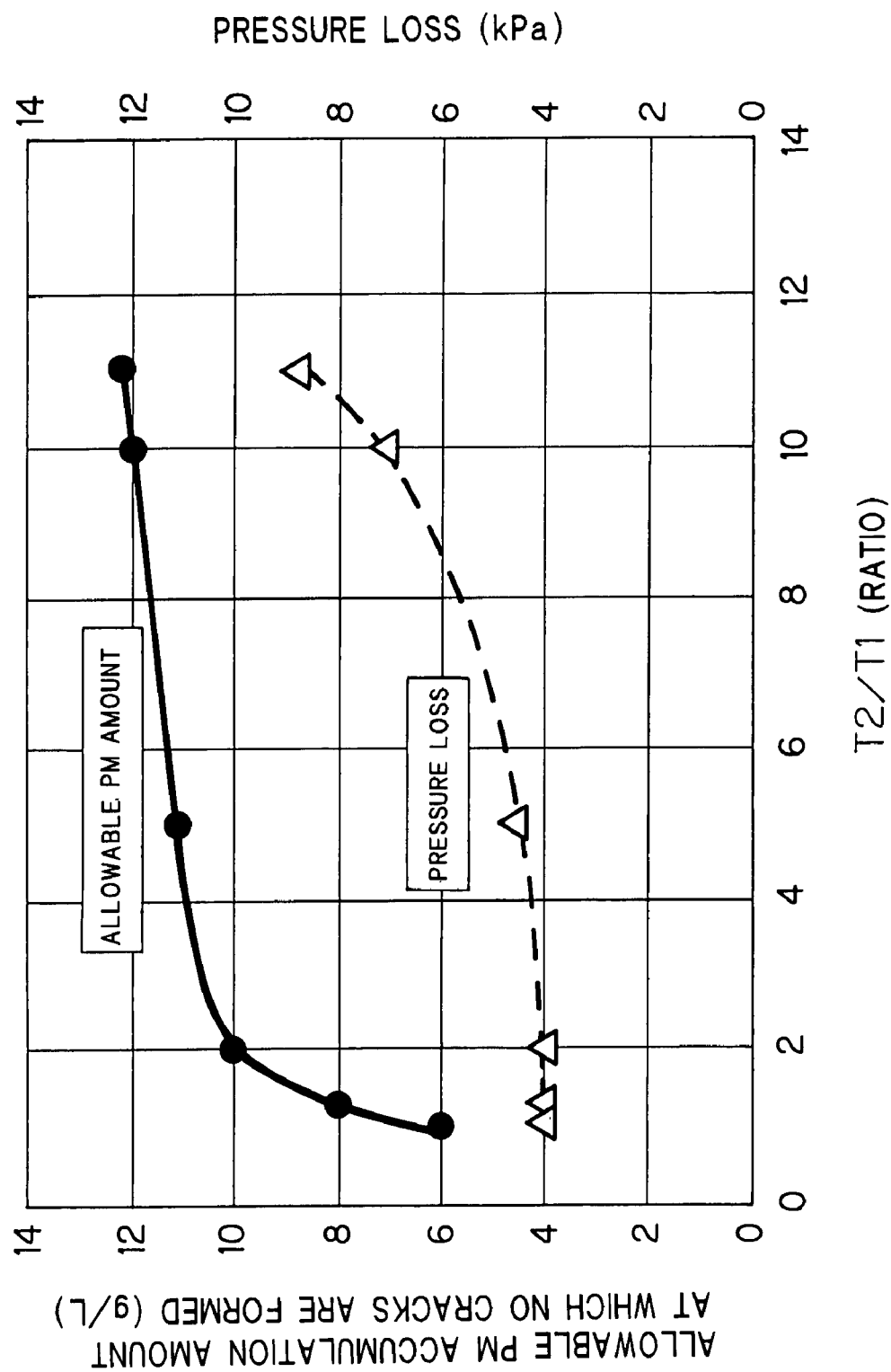
FIG. 13 is a graph schematically showing the relation between [(T2)/(T1)] and an allowable PM accumulation amount with no crack and the relation between [(T2)/(T1)] and pressure loss (kPa).
Figure 14:
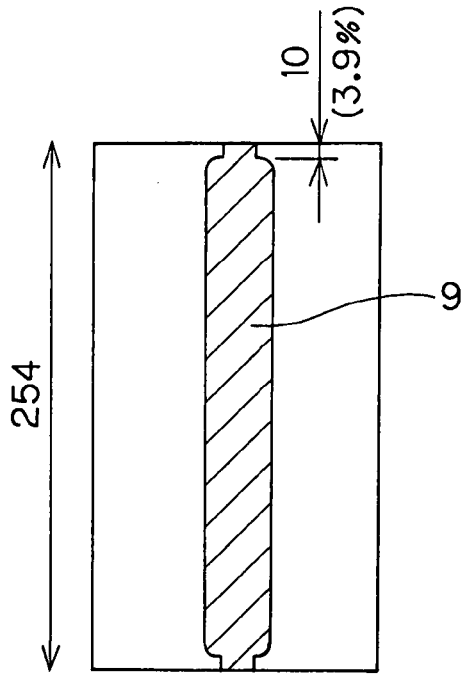
FIG. 14 is an explanatory view schematically showing thickness of a bonding material layer in Example 5.
Figure 15:
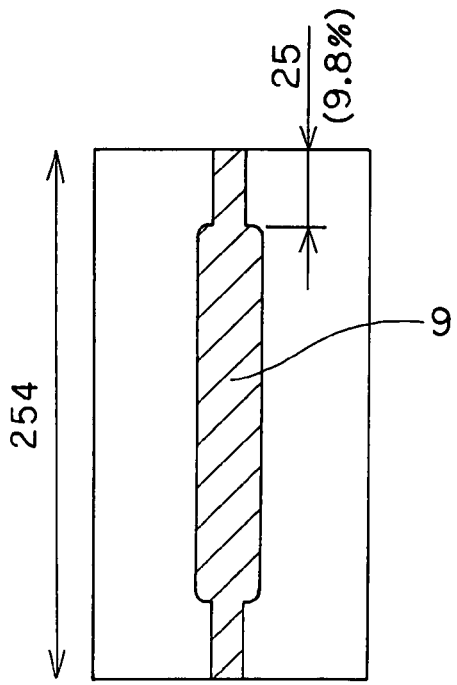
FIG. 15 is an explanatory view schematically showing thickness of a bonding material layer in Example 6.
Figure 16:
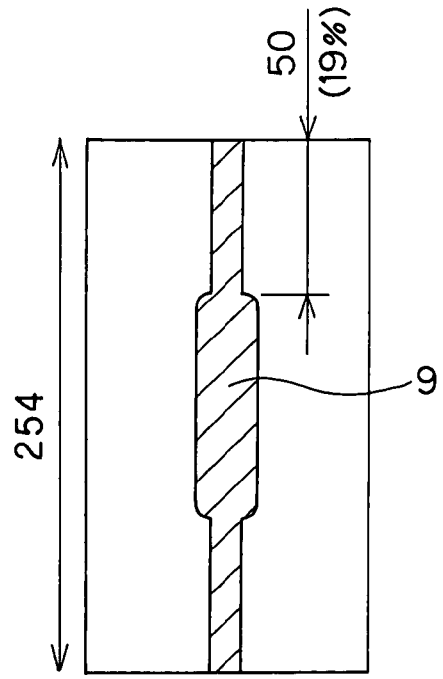
FIG. 16 is an explanatory view schematically showing thickness of a bonding material layer in Example 7.
Figure 17:
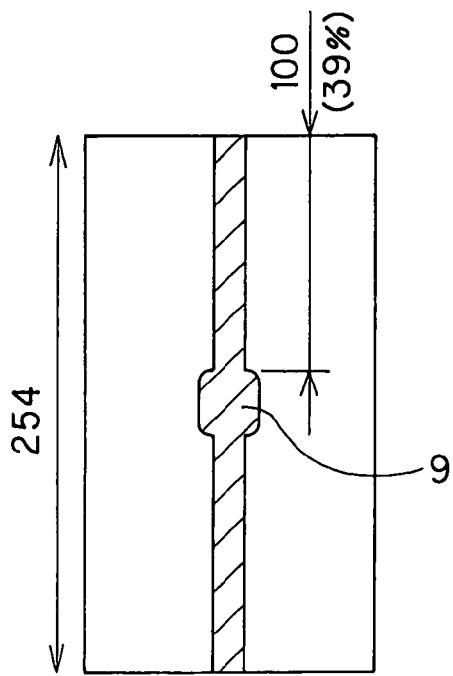
FIG. 17 is an explanatory view schematically showing thickness of a bonding material layer in Example 8.
Figure 18:
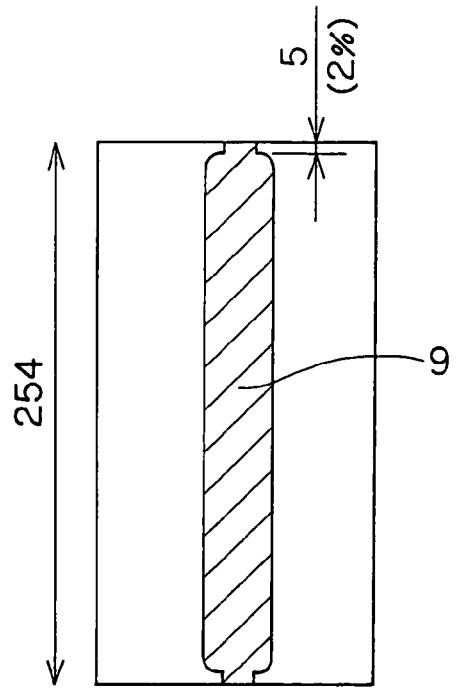
FIG. 18 is an explanatory view schematically showing thickness of a bonding material layer in Comparative Example 3.
Figure 19:
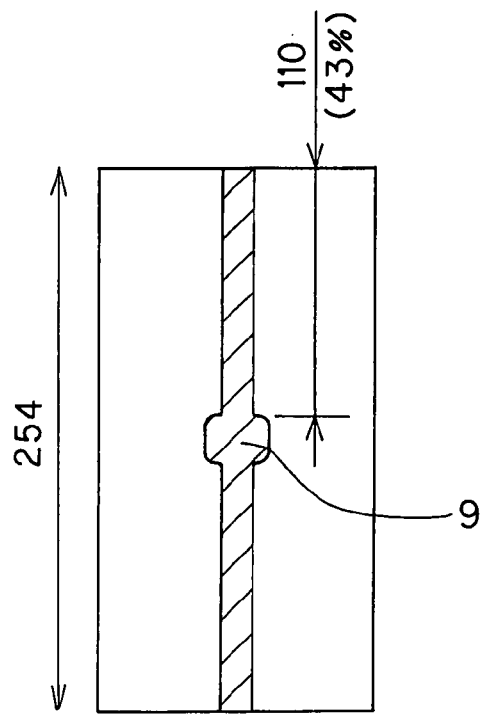
FIG. 19 is an explanatory view schematically showing thickness of a bonding material layer in Comparative Example 4.
Figure 20:
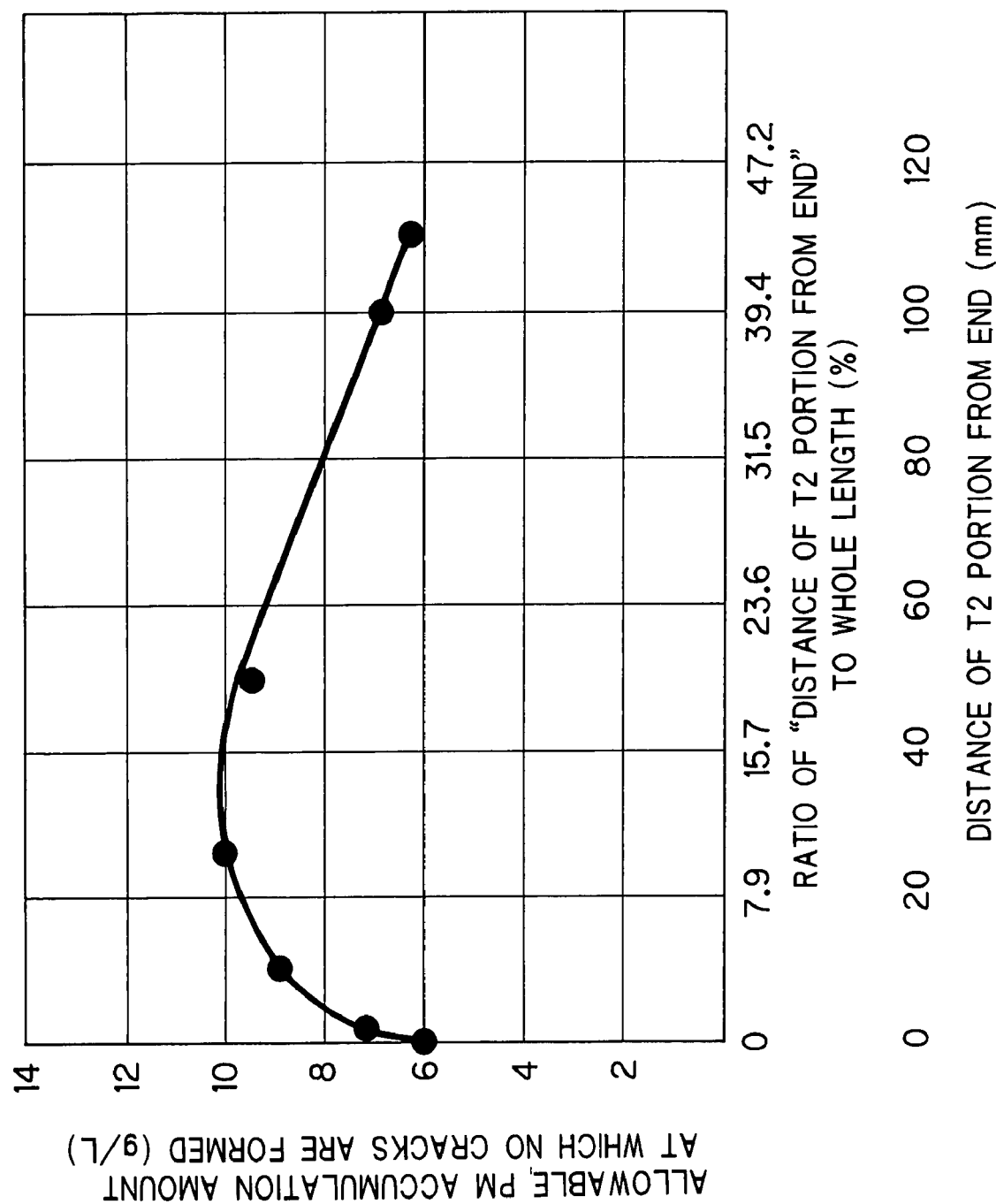
FIG. 20 is a graph schematically showing the relation between rate (%) of length from an end portion to (T2) portion with respect to the whole length and between a distance (mm) from an end portion to (T2) portion and an allowable PM accumulation amount (g/L) with no crack.

From Table 1, FIG. 13 and FIG. 20, it can be understood that an allowable PM accumulation amount can be improved remarkably by minimizing increment of pressure loss by the present invention.

INDUSTRIAL APPLICABILITY

A honeycomb structure of the present invention is useful as a trapping filter for exhaust gas, for example, as a diesel particulate filter (DPF) for trapping PM contained in exhaust gas from a diesel engine.

The invention claimed is:

1. A honeycomb structure comprising:
a honeycomb segment joined body having a plurality of honeycomb segments integrally joined at joint faces by means of a bonding material layer, and
an outer peripheral coat layer covering an outer peripheral surface of the honeycomb segment joined body,
with a structure having plurality of cells functioning as fluid passages disposed in parallel with one another between two end portions of the honeycomb segment joined body in a central axis direction;
wherein a thickness of the bonding material layer satisfies the relation of $(T2)=(1.2 \text{ to } 10.0)\times(T1)$ between an average thickness (T1) at both end portions and a maximum thickness (T2) between two positions away from the end portions, the two positions each being 3 to 40% of the whole length of the honeycomb segment apart from a respective one of the end portions.

2. A honeycomb structure according to claim 1, wherein the honeycomb segment has a square cross-sectional shape.

3. A honeycomb structure according to claim 1, wherein the honeycomb segment joined body has a circular, an elliptic, or a race-track shape of a cross-section perpendicular to the central axis direction.

4. A honeycomb structure according to claim 1, wherein the honeycomb segment has a thermal expansion coefficient of $1\times10-6/°$ C. or more.

5. A honeycomb structure according to claim 2, wherein the honeycomb segment joined body has a circular, an elliptic, or a race-track shape of a cross-section perpendicular to the central axis direction.

6. A honeycomb structure according to claim 2, wherein the honeycomb segment has a thermal expansion coefficient of $1\times10-6/°$ C. or more.

7. A honeycomb structure according to claim 3, wherein the honeycomb segment has a thermal expansion coefficient of $1\times10-6/°$ C. or more.

8. A honeycomb structure according to claim 5, wherein the honeycomb segment has a thermal expansion coefficient of $1\times10\times6/°$ C. or more.

* * * * *